June 27, 1961  S. C. ROCKAFELLOW  2,989,891
APPARATUS FOR INSPECTING ARTICLES
Filed Feb. 19, 1957  3 Sheets-Sheet 2

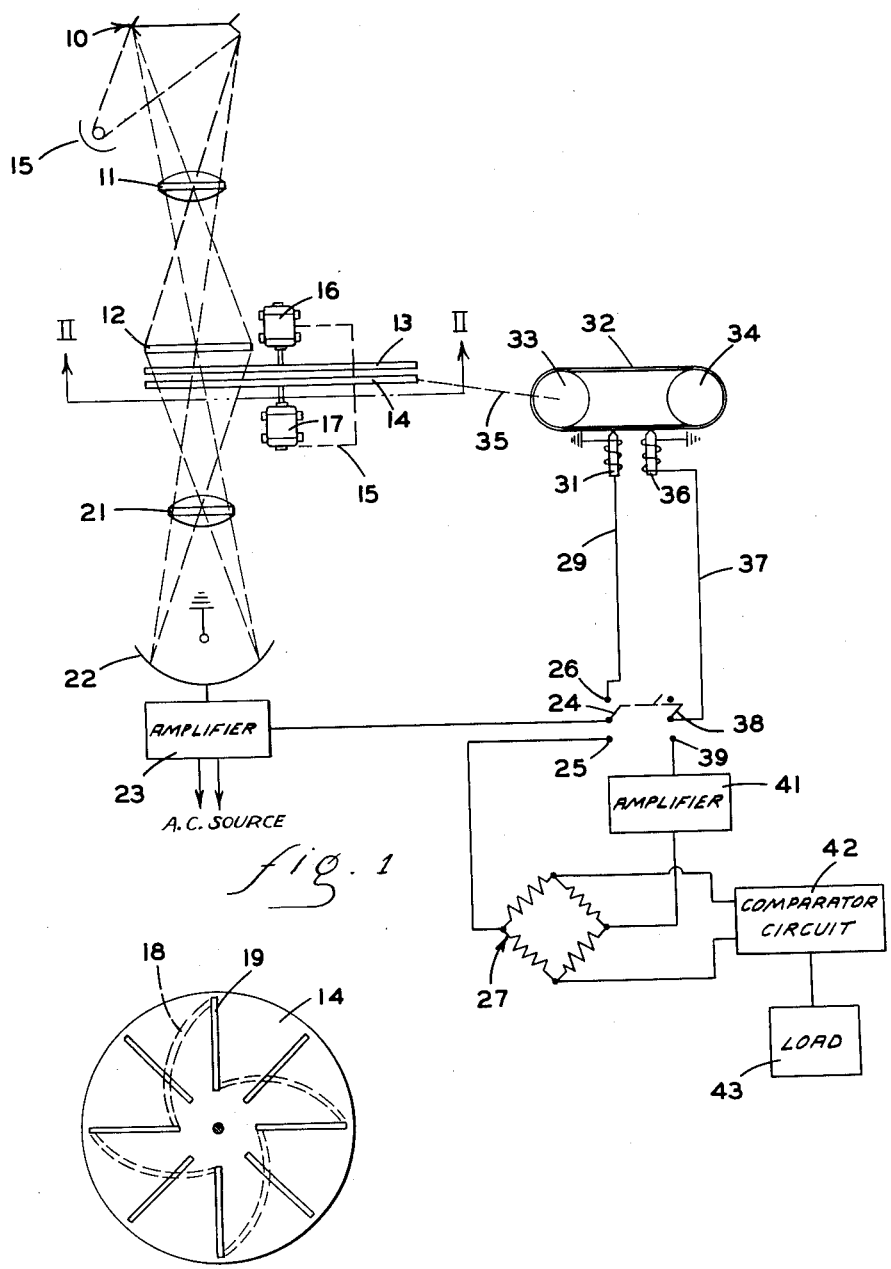

INVENTOR.
STUART C. ROCKAFELLOW
BY
Woodhams Blanchard and Flynn
ATTORNEYS

June 27, 1961  S. C. ROCKAFELLOW  2,989,891
APPARATUS FOR INSPECTING ARTICLES
Filed Feb. 19, 1957  3 Sheets-Sheet 3
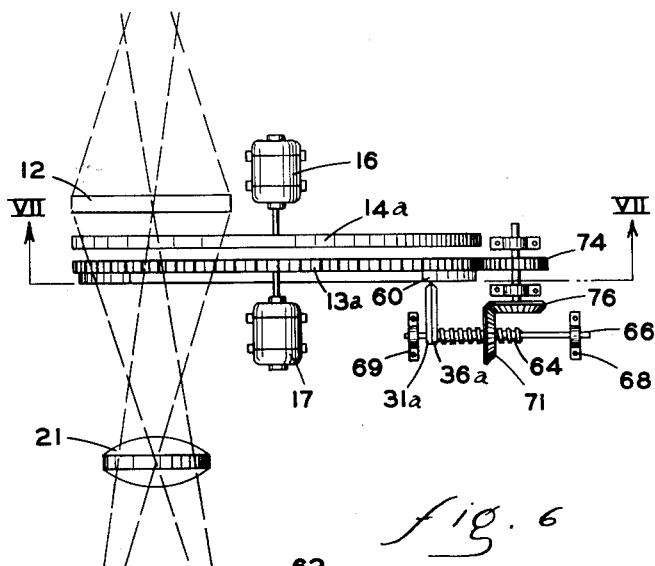
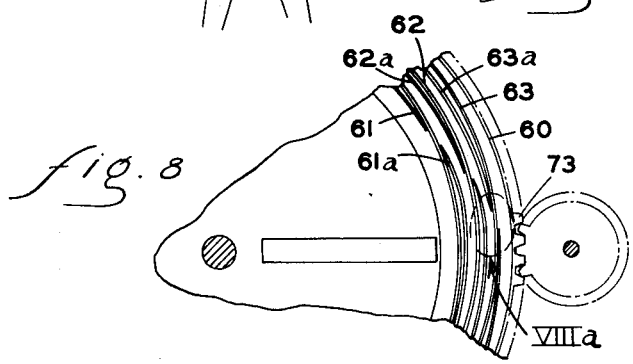
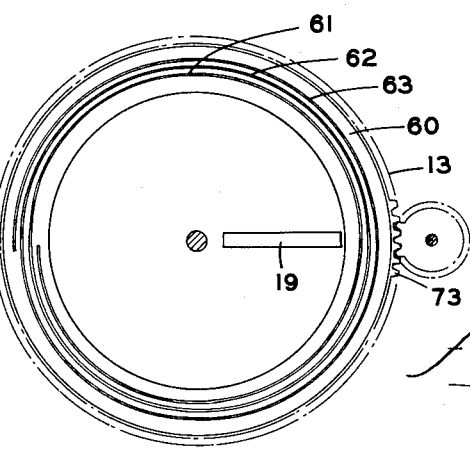
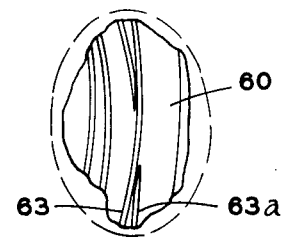
INVENTOR.
STUART C. ROCKAFELLOW
BY
Woodhams, Blanchard & Flynn
ATTORNEYS

United States Patent Office 2,989,891
Patented June 27, 1961

2,989,891
APPARATUS FOR INSPECTING ARTICLES
Stuart C. Rockafellow, Plymouth, Mich., assignor to Robotron Corporation
Filed Feb. 19, 1957, Ser. No. 641,206
3 Claims. (Cl. 88—14)

This invention relates to apparatus for inspecting a manufactured article and, more particularly, it relates to apparatus for comparing such an article with an article having previously approved structural characteristics. This application is a continuation-in-part of my co-pending application, Serial No. 514,337, filed June 9, 1955, now Patent No. 2,898,801. This application also pertains to the subject matter of my co-pending application Serial No. 613,724, filed October 3, 1956, now Patent No. 2,899,857.

In my first mentioned co-pending application, there is disclosed a process and an apparatus for comparing an article with a standard in which light is simultaneously caused to be reflected or transmitted from the article and from the standard in two separate light paths, which paths are simultaneously scanned by means using scanning disks. The light transmitted through the scanning disks passes to photoelectric cells, and the outputs of the photoelectric cells are compared so that any difference between the light from the standard and the light form the test article, such as differences resulting from a discrepancy between their configurations, causes an unbalance in an electrical circuit which then actuates a suitable alarm or other desired device. In my second mentioned, co-pending application, there is disclosed a process and apparatus for inspecting all or a portion of the contour of a manufactured article in which the test article and the standard are illuminated and the light beam passing beyond the edges of said test article and the light beam passing beyond the edges of said standard are simultaneously scanned and the silhouettes of the standard and of the test article appearing in said beams are compared by means using a scanning disk, in substantially the same manner as above described.

Thus, in both of my prior applications, it has been required to simultaneously scan both the test article and the standard and, consequently, it has required the precise positioning of both the test article and the standard with respect to the inspection apparatus and with respect to each other, in order to give an effective and meaningful inspection operation. This precise positioning is sometimes difficult to achieve, particularly in high speed manufacturing operations where the inspection time is necessarily quite limited. Further, these prior arrangements have required the use of disks which must be manufactured to close tolerances, particularly in connection with the size, orientation and symmetry of the slots through which the light is transmitted. In addition, the disks must be carefully mounted in precise alignment with the positions of the test article and the standard during the inspection operation. Any rough usage of this type of inspection device, and sometimes even normal factory use thereof, may cause misalignment of the parts thereof and require that the disks be re-positioned in their proper locations. This is necessarily a time-consuming operation and requires the presence of a skilled technician. Thus, in many instances, the inspection devices in accordance with my aforementioned applications are unsuitable for certain types of inspection operations, particularly where the inspection device may be subjected to severe and rough operating conditions.

Further, the requirement, by my prior inspection devices, of the continuous presence of the standard is often inconvenient in that the standard may interfere with the normal traffic or movement of the manufactured articles at that particular region of the assembly line. Still further, it is sometimes desired to use the test article for other purposes, such as testing its operating characteristics, which makes it desirable to remove the test article from its position in alignment with the inspection device. Also, it may happen that the inspection device will be shifted from the inspection of an article of one character to the inspection of an article of another character, which may require an entirely new setup for the inspection device. Thus, the continuous presence of the standard and its precise alignment with the scanning disks has somewhat limited the utility of the inspection devices disclosed in my aforementioned applications.

Accordingly, it is an object of this invention to provide an inspection apparatus, which does not require precision manufactured equipment or precise positioning of the test article and the standard.

It is a further object of this invention to provide an inspection apparatus, as aforesaid, which does not depend for its successful operation upon the simultaneous optical comparison of the test article and the standard, and hence does not require the continuous presence of the standard article during an inspection operation.

It is a further object of this invention to provide an inspection apparatus, as aforesaid, which uses simple and reliable parts, which does not require frequent and/or expensive maintenance, and which effectively scans the test article, even though the mechanical parts of the inspection apparatus are not manufactured to close tolerances.

It is a further object of this invention to provide an inspection apparatus, as aforesaid, in which any modification in the inspection device itself, e.g., substitution of a scanning disk or change in the perspective from which the test article is viewed, can be easily accommodated by re-viewing the standard and recording a series of electrical impulses therefrom for use with the inspection device in its changed condition.

Other objects and advantages of this invention will become apparent to persons acquainted with equipment of this type upon reading the following description and inspecting the accompanying drawings, in which:

FIGURE 1 is a schematic view of the apparatus used in carrying out the invention.

FIGURE 2 is a view taken along the line II—II of FIGURE 1.

FIGURE 6 is a schematic view similar to FIGURE 1 and showing a further modification.

FIGURE 7 is a fragmentary section taken on the line VII—VII of FIGURE 6.

FIGURE 8 is a fragmentary view of a scanning disk similar to that shown in FIGURE 7 and showing a still further modification.

FIGURE 8a is a portion of FIGURE 8 showing same on an enlarged scale.

General description

Figure 3:
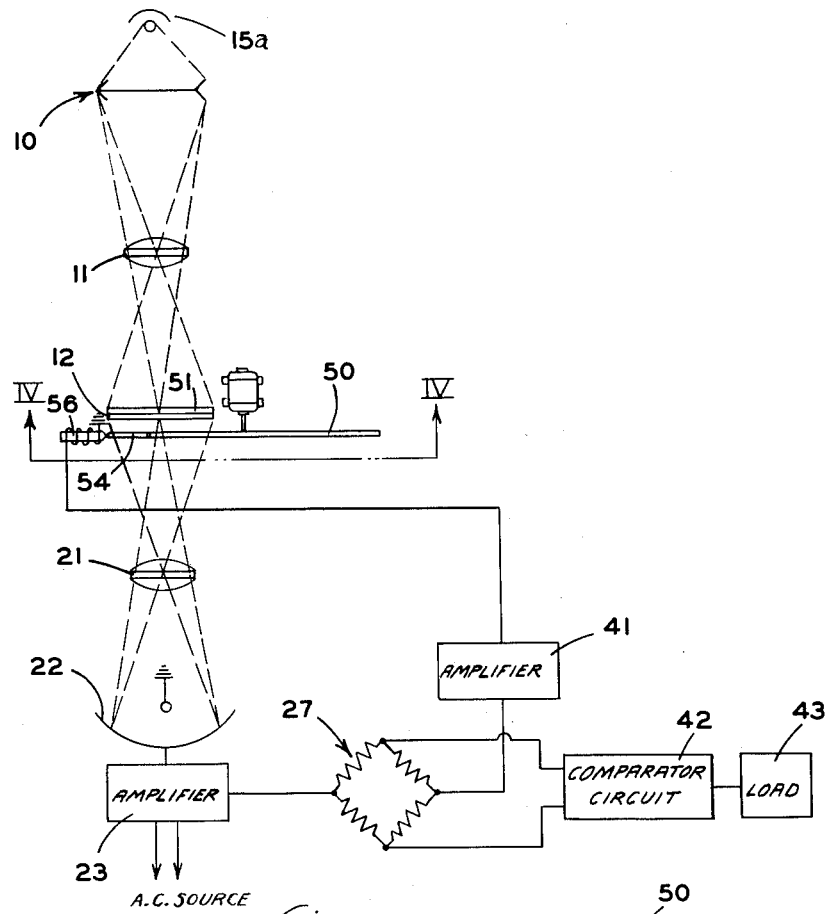
FIGURE 3 is a schematic diagram of a modified apparatus for carrying out the invention.

In general, this invention provides a process for comparing a test article and a standard, which includes the steps of reflecting or transmitting radiation from the standard, scanning the standard and isolating radiation from successive portions of the standard, and converting said radiation into pulsating electrical energy, which energy is then recorded upon a suitable medium for subsequent reproduction. Radiation reflected or transmitted from the test article is then scanned, and the radiation from successive portions thereof is transmitted through the scanning disk and converted into pulsating electrical energy. Simultaneously with the scanning of the test article, the recorded electrical energy from the standard is reproduced, and the reproduced electrical energy and the electrical energy from the test article are simultaneously compared in a suitable comparator circuit. If there is an unbalance in the two electrical energies so compared, indicating within the tolerances of the apparatus that the standard and the test article are dissimilar, an alarm or other responsive means will be actuated as desired.

The apparatus for carrying out the invention includes a movable element, having at least one slot therethrough, said element serving to scan the article being examined and to transmit radiation therefrom to a suitable light responsive electric cell. A suitable recording mechanism is provided and is connectible to the output of said cell for recording a series of electrical impulses from the standard onto a reproducing medium. After a suitable record is made, a play-back head or similar device is connected for energization by said reproducing medium, and a suitable electrical comparator circuit is connected to receive the reproduced electrical impulses from the play-back head or similar device. Said comparator circuit is also connected to the output of said cell, whereby both the series of electrical impulses originating in said reproducing medium and the series of electrical impulses from the cell generated by the scanning of the test article may be simultaneously compared.

*Detailed description*

Referring to FIGURE 1, there is designated a position 10, which will be occupied by the article under inspection at a given time. Said article will, for illustrative purposes, be hereinafter assumed to be opaque in which case the light will be reflected from it. However, the article may be of light transmissive character as well, such as where a photographic transparency is used as the standard or where transparent articles having a distinctive color pattern are being inspected, and the invention will apply as well thereto. Light rays from the article at 10 are transmitted through a lens system, indicated generally at 11, and are focused in an image plane, here for illustrative purposes occupied by an image plate 12 of any convenient type, such as a ground glass plate. A pair of rotatable disks 13 and 14 are positioned behind the image plate 12. The disks are herein shown to be co-axial, although it will be apparent that they may be arranged with their axes in parallel, but offset, relationship as, for example, shown in my first mentioned co-pending application. The disks 13 and 14 are adapted to be rotated by means, such as motors 16 and 17, respectively, the disk 14 ordinarily being rotated at a speed materially greater than the speed of rotation of the disk 13, which speeds when established are locked firmly with respect to each other by any convenient means, either mechanical or electrical and schematically indicated by the broken line 15. The disk 13 has a series, here four, of slots 18 therethrough, said slots in this embodiment of the invention being arcuate, arranged symmetrically on said disk and extending from a position adjacent the periphery of said disk at one of their ends to a position adjacent the center of the disk at the other of their ends. The disk 14 has a series of slots 19 (FIGURE 2), said slots extending radially on said disk and being positioned for intersecting the slots 18 in all, or substantially all, relative positions of said disks. It is apparent, since the disk 14 rotates faster than the disk 13, that the intersection of the slots 18 and 19 will sweep along the slots 18 as said slots 18 move slowly across the light path from the article. The intersection of slots 18 and 19 provides an aperture which permits a portion of the radiation from the test article to be transmitted therethrough.

The light transmitted through the disks 13 and 14 passes through a further lens system, indicated generally at 21, and thence to the cathode 22 of a photoelectric cell. The output of the photoelectric cell is connected to any conventional amplifier system 23. The output of the amplifier system is connected to a switch 24 which is adapted to be moved between the contacts 25 and 26. Contact 25 is connected to one side of a conventional bridge circuit 27. A conductor 29 is connected to the contact 26 and to a recording head 31, of any convenient construction, for energization thereof. The recording head 31 is adapted to record on any suitable medium capable of making a reproducible record of electrical impulses, such as the tape 32. The tape 32 encircles drums 33 and 34 and is moved thereby in a known fashion, the broken line 35 indicating a connection (mechanical or electrical) between drum 33 and disk 14 for synchronizing the driving of said disk and drum. A playback head 36 is positioned to reproduce the impressions made on the recording tape 32 by the recording head 31. The play-back head 36 is connected by a conductor 37 to the armature 38, which is selectively engageable with a contact 39. The contact 39 is connected through any convenient amplifier circuit 41 to the other side of the bridge circuit 27. The output of the bridge circuit 27 is connected to a comparator circuit 42 of any convenient type, such as that shown in my first mentioned, co-pending application, and is then connected to a load 43, such as a suitable alarm or gate device.

*Operation*

In setting up the device for inspecting a series of articles intended to be of identical shape configuration, the standard, that is, an article having previously approved shape characteristics, is placed in the position indicated at 10 and is suitably illuminated. Light rays reflected from said article are focused upon the image plate 12. The disks 13 and 14 are rotated, disk 13 being rotated at a considerably slower speed than disk 14 so that the slots 18 sweep across the image projected on the plate 12 at a relatively slow speed. At the same time, the slots 19 successively move across and intersect the slots 18 to provide an aperture for passage of the light rays therethrough. The speed of rotation of the disk 14 is enough faster than that of the disk 13 so that several successive slots 19 sweep across an individual slot 18 and transmit light rays which overlap successive portions of the article, whereby a complete and thorough scanning of the image on the plate 12 is achieved. The scanning of both the standard and the test article is achieved in this embodiment in the same manner as is described in detail in my first mentioned, co-pending application and reference should be made thereto for a more detailed description of this operation.

The light transmitted through the aperture formed by the intersection of slots 18 and 19 is focused by the lens system 21 on the cathode 22 of the photoelectric cell. The output of the photoelectric cell consists of a series of electrical impulses which are modulated in a sequential pattern corresponding to the light impulses received. These are amplified and fed to the switch 24. During the initial operation in which the standard is scanned, the switch 24 is placed in contact with the contact 26. Thus, the electrical impulses are fed from the amplifier 23 to the recording head 31, and are recorded thereby upon the recording medium 32. The recording medium 32 thus contains a permanent and reproducible record of the electrical impulses generated by the radiation from the standard.

During the subsequent inspection operations, an article to be examined is placed in the position 10. The switch 24 is placed in contact with the contact 25, the armature 38 is placed in contact with the contact 39 and the playback head 36 is energized. The movement of the recording medium 32 is synchronized with the positioning of the test article at 10 and with the rotation and position of the slots 18 and 19 in the disks 13 and 14, so that the series of electrical impulses played back by said playback head 36, which correspond with the electrical impulses from the scanning of the standard, is synchronized with the electrical impulses from the scanning of the corresponding portions of the test article. The output from the photoelectric cell is fed to one side of the bridge circuit 27 and the output from the play-back head 36 is fed to the other side of said bridge circuit, the respective outputs being so arranged that they are synchronized to indicate the impulses from corresponding portions of the standard and the test article. The output from the two sides of the bridge circuit 27 is fed to the comparator circuit and compared thereby. If the respective signals from the photoelectric cell and from the play-back head are unbalanced, indicating a discrepancy between the test article and the standard, the comparator circuit will energize a load to give a visual or audible indication that the test article does not conform to the standard or it may actuate a gate for automatically discharging the improper test article from the production or assembly line.

It will be observed that any defect or irregularity in the shape, position or movement of the slots 18 and 19 or of the disks 13 and 14 will have no effect upon the accuracy of the comparison operation, provided only that the defect is of a constant or of a regularly repeating character, because both the reproduction of the impulses from the standard and the series of impulses from the test article will be similarly affected by the irregularity. Thus, the reproduction and the series of impulses from the test article will have corresponding characteristics as the result of any defect of constant or repeating character in the scanning mechanism and such irregularities in the respective signals will cancel each other out. Similarly, any irregularities in the lens system, image plate, photoelectric cell, or other parts of the apparatus, so long as they are of constant or regularly repeating character, will cancel themselves out in the manner above indicated.

The reproducing medium may take a variety of forms. Thus, it could, among other things, be a conventional tape or wire recorder, or it could be a drum recorder. In one satisfactory embodiment of the invention, the reproducing medium was a drum of 10 inch diameter, having a ferrous oxide coating on the periphery thereof. The drum was rotated at one revolution per second, one revolution being equivalent of the scanning of one article. Thus, about 31.42 inches of the reproducing medium were available for recording the impulses from one article. The recording head had a frequency response of about 40,000 cycles per second.

In one satisfactory manner of operating said embodiment, the reproducing medium 32 makes one complete cycle of its movement for each inspection operation. Each complete cycle may consist of a scanning by intersection of the slots 18 and 19, using only one of the slower moving slots 18, or it may consist of the scanning by the inter-action of said disks, using more than one of said slower moving slots 18. In any event, the impulses being reproduced must be the result of scanning under the same conditions as are present during the transmission of impulses from the standard article during any given comparison operation.

*Modifications*

Figure 4:
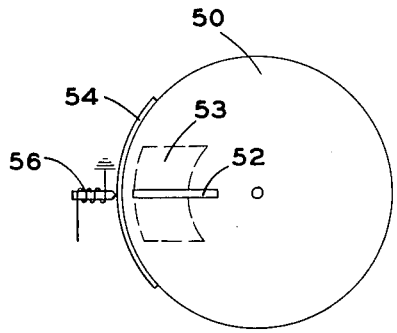
FIGURE 4 is a view of the scanning disk, taken along the line IV—IV of FIGURE 3.

In FIGURES 3 and 4, there is shown a structure, which contains many of the elements previously described with respect to the embodiment shown in FIGURE 1 but which is intended only for comparing external contour and usable only where detailed scanning of the entirety of an article is not needed and the scanning of its silhouette is sufficient as described in my application Serial No. 613,724. The elements used in both of these modifications are indicated by the same reference numerals and a detailed description thereof is believed unnecessary, excepting to note that the light source 15a is here shown as located behind the article being examined.

Here, a single disk 50 is utilized for scanning purposes, said disk being made of a suitable, non-magnetic material. The image projected on the image plate 12 is masked by a fixed screen 51, said screen having an opening 53 of sufficient size to transmit therethrough light from the source and passing around the article being inspected. The disk 50 has a single slot 52 therethrough, said slot being adapted to sweep across the opening 53 in the screen 51 to provide a moving elongated aperture in periodic, repeated, register with said opening 53. This aperture permits light rays to pass therethrough and impinge upon the cathode of the photoelectric cell, which actuates the circuitry, as described with respect to the preceding embodiment.

A coating 54 of suitable recording material, such as a ferrous oxide, is placed upon the periphery of the disk 50. The coating 54 desirably is of substantially the same circumferentially arcuate extent with respect to the center of the disk 50 as is the edge of the arcuately longest side of the opening 53 and is radially aligned therewith. Thus, the play-back head 56 will reproduce the series of impulses from the standard simultaneously with the scanning of a corresponding portion of the aperture 53 through which the test article's silhouette is seen and the production of a series of impulses therefrom.

It is apparent that the coating 54 can be of lesser circumferential extent, so that it is capable of reproducing impulses from only a portion of the aperture. Further, it will be apparent that the coating 54 need not be aligned with the opening 53, as it could occupy any desired position on the periphery of the disk 50 provided only that the play-back head be positioned suitably adjacent to the coating 54 for actuation thereby. (It will be understood that there will also be a recording head provided for recording the series of electrical impulses from the standard upon the coating 54 during the initial scanning operation wherein the standard is scanned. However, for the purpose of simplicity in illustration, and in view of the disclosure made with respect to the embodiment shown in FIGURE 1, it is believed unnecessary to illustrate the recording head herein.) The play-back head 56 is connected through the amplifier 41 and bridge circuit 27 to the comparator circuit 42 and load 43, as in the previously described embodiment.

The operation of this modification is substantially the same as that previously described. That is, during the initial operation, a series of impulses from the photoelectric cell is applied to the coating 54 by a suitable recording head. During the subsequent inspection operations, the impulses from the test article are transmitted to the bridge circuit 27 simultaneously with the impulses from the standard, which are reproduced by the play-back head 56.

This embodiment does not require any special precautions for properly synchronizing the operation of the recording medium or for the rotation of the disks, which precautions are necessary in the embodiment shown in FIGURE 1. Provided only that the standard and each successive test article occupies the same position with respect to the aperture 53, such synchronizing as is needed is provided by the positioning of the recording strip 54 in a fixed location with respect to the aperture 53. However, due to the smaller length of the reproducing medium available, with any disk of conveniently usable size and the fact that only the article's silhouette is viewed, it will be apparent that this embodiment is not as sensitive for inspection purposes as is the previously described embodiment.

Figure 5:
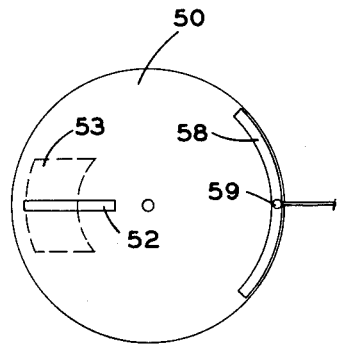
FIGURE 5 is a view of the scanning disk, similar to FIGURE 4, showing a modification thereof.

In FIGURE 5 there is shown a modification of the embodiment shown in FIGURES 3 and 4. In this instance, the coating 58, on which the impulses from the standard are recorded, is applied to the face of the disk 50, preferably near its edge, said coating being of the same circumferential extent as the arcuately longest side edge of the opening 53 in the screen 51, for the reasons previously discussed. The play-back head is herein indicated at 59. The operation of this modification is the same as that described with respect to the modification shown in FIGURES 3 and 4.

In FIGURES 6 and 7 there is shown a further modification adapted for the same operating requirements as the embodiment of FIGURES 1 and 2 and particularly intended for situations where the slower disk 13 will make more than one revolution in a single scanning, such as where the device is used to scan an article which is too large to be projected in the desired detail onto the plate 12 at one time and hence is projected thereon stepwise or while progressively moving or where a repeating series of dissimilar articles are being inspected.

In this embodiment, the recording medium is placed on the face of the slower of the two disks shown in the modifications of FIGURES 1 and 2, and is placed thereon in a single strip 60 having thereon, as shown in FIGURE 7, a spiral recording path comprising the three turns 61, 62 and 63. The recording and play-back heads 31a and 36a are here mounted as a single unit which is mounted on a worm 64. The worm 64 is slidably but non-rotatably mounted on any convenient means schematically illustrated as square rod 66 supported by the base members 68 and 69. The worm 64 is encircled by a gear 71 having a threaded central opening for engaging the flights of said worm. The gear 71 is rotatable about rod 66 but axially non-movable with respect to base members 68 and 69. The disk 13a is mechanically connected to the gear 71 in such a manner that rotation of said disk will cause rotation of said gear 71 and this in turn will cause axial movement of the worm 64 with respect to the frame of the apparatus. Satisfactory mechanism is provided by gear teeth 73 on the periphery of the disk 13a which gear teeth are connected through further gears 74 and 76 so that motion of the disk 14a will be transferred in precisely controllable relationship to the gear 71 and thence to the worm 64.

In this manner, the disk 13a may rotate as many times as is desired in order to give a complete scanning of the article, or group of articles, each rotation of the disk moving the recording and play-back head unit around one of the turns of the recording strip 60. Electrical impulses resulting from the scanning of the standard will be recorded on the turns of the spiral recording path as in the previously described embodiments. When the test article is subsequently scanned, the play-back head 36a will follow exactly the same path and relationship with all parts of the test article, or all units of a selected and repeating group of test articles, as the recording head 31a previously followed with respect to the standard and the inspection operation will be carried out as previously described. It will be apparent that after each scanning operation the disk 13a in this embodiment must be rotated in the opposite direction from its direction of rotation during the scanning operation in order to return the recording and play-back unit to its original position for the next scanning operation. However, by using a self-reversing worm and recording a spiral standard track in both spiral directions, both from inside outwardly and from outside inwardly wherein the return tracks 61a, 62a and 63a may discontinuously cross the other tracks (FIGURES 8 and 8a) without interferring materially with the continuity of the record, such runback may be avoided and a continuous operation achieved.

This modification, like the modifications of FIGURES 3 to 5, inclusive, eliminates some of the problems of synchronizing the recording path with the rotation of the disks, which problems exist with the structure of FIGURES 1 and 2. It provides a longer recording medium, for the same size disk, than do the embodiments of FIGURES 3 and 5 and therefore permits a more sensitive inspection operation.

Throughout the foregoing description, reference has been made only to the structural configuration of the articles, both standard and test, being compared. It will be recognized, however, that this is solely for the purpose of illustration and that the invention is also applicable, within at least some of its purposes, to the comparison of any characteristic of the articles being inspected, whether three dimensional, two dimensional or a function of either an external characteristic of the article, such as color, or whether a function of an internal characteristic of the article, such as its composition or its crystalline structure, and whether identified by radiation reflected from, or transmitted around, an opaque article or identified by radiation transmitted through a radiation transmitting article.

Similarly, while it has been assumed that ordinary visible light is utilized as the radiation media by which the inspection of the standard and the test articles is carried out, and such is above utilized for descriptive purposes, it will be recognized that any kind of electromagnetic radiation such as ultra-violet, infra-red or X-rays, or a corpuscular radiation such as beta rays, capable of responding to the desired characteristic of the standard and the test articles and of controlling a suitable electro-responsive cell are within the scope of the present invention, and that different types of radiation applicable to various uses may be freely selected, according to the particular characteristics of the inspections to be made, without departure from the scope of the present invention.

While the foregoing description has referred for convenience to rotatable scanning elements, it is apparent also that the scanning elements could also be reciprocable plates, as disclosed in my first mentioned, copending application.

Further, while one of the major advantages of the invention lies in the utilizing of the same equipment for scanning both the standard and the test article, it will be understood that if two or more scanning units are made substantially identical with each other, many of the advantages of the invention may still be secured by making the record of the standard in one location and on one piece of equipment and effecting the inspection operation on other equipment in another location. Thus, for example, quality can be controlled in one or more branch plants by standard recordings made in a central plant or laboratory. For this purpose, the tape of FIGURE 1 may be used or the coating strips of the other figures may be made removable from the disks shown and reapplicable to other disks, if desired, or a disk bearing a record coating strip may be transferred from one machine to another.

While the ground glass plate 12 has been utilized herein as an aid to explaining the invention, it will be apparent that it may be omitted, by suitable modification of the lens system, without departing from the scope of the invention.

Although the above mentioned drawings and description refer to particular, preferred embodiments of my invention, it is not my intention, implied or otherwise, to eliminate other variations or modifications, which do not depart from the scope of the invention as defined in the hereinafter appended claims.

I claim:

1. A device for comparing a test article with a standard article which includes a pair of parallel, overlapping, relatively rotatable disks having elongated apertures therethrough which intersect when said disks are rotated to define a movable path for transmitting radiation; motor means for rotating said disks at different speeds so that the apertures in one disk move along the apertures in the other disk; a radiation responsive photoelectric means aligned with said path for converting radiation corresponding to selected characteristics of said articles into electrical impulses; a movable recording medium and means for moving same in synchronism with the relative rotation of said disks; recording means for recording said electrical impulses on said recording medium, first switch means for selectively connecting said recording means to said radiation responsive photoelectric means; means for reproducing electrical impulses from said recording medium; a circuit for comparing two series of electrical impulses; second switch means for selectively connecting said reproducing means to said circuit; and third switch means selectively connecting said radiation responsive means to said circuit.

2. The device of claim 1 wherein said recording medium includes a coating on one of said disks which is sensitive to electrical impulses for the recording thereon and which will reproduce such electrical impulses when said reproducing means is applied thereto.

3. The device of claim 1 wherein said recording medium is arranged in a spiral on the face of said one disk and includes a plurality of turns and means connected to one of said disks for moving said recording means and said reproducing means radially with recording medium as said one disk rotates.

References Cited in the file of this patent

UNITED STATES PATENTS

| | | |
|---|---|---|
| 1,996,760 | Good | Apr. 9, 1935 |
| 2,371,963 | La Pierre | Mar. 20, 1945 |
| 2,493,543 | Merchant | Jan. 3, 1950 |
| 2,731,621 | Sontheimer | Jan. 17, 1956 |
| 2,750,519 | Summerhays et al. | June 12, 1956 |